United States Patent
Charng

(10) Patent No.: US 6,683,292 B1
(45) Date of Patent: Jan. 27, 2004

(54) WINDSHIELD WIPER SPOILER DISPLAY

(75) Inventor: Sheng-Kao Charng, Taipei (TW)

(73) Assignee: Clearco Product Limited, Wu Ku Hsiang (TW)

( * ) Notice: Subject to any disclaimer, the term of this patent is extended or adjusted under 35 U.S.C. 154(b) by 0 days.

(21) Appl. No.: 10/267,880

(22) Filed: Oct. 10, 2002

(51) Int. Cl.[7] ................................................. G01J 1/32
(52) U.S. Cl. ...................................... 250/205; 250/239
(58) Field of Search ................................ 250/205, 239; 215/250.43, 250.44, 250.201; 315/149, 154, 156, 159; 362/257, 276

(56) References Cited

U.S. PATENT DOCUMENTS 5,093,954 A * 3/1992 Kuzuno ................. 15/250.201
6,175,196 B1 * 1/2001 Ragner et al. .......... 315/200 A
6,338,178 B1 * 1/2002 Leu ........................ 15/250.201
6,485,169 B1 * 11/2002 Ragner ........................ 362/500

* cited by examiner

Primary Examiner—Kevin Pyo
Assistant Examiner—Seung C. Sohn
(74) Attorney, Agent, or Firm—Leong C. Lei

(57) ABSTRACT

A windshield wiper spoiler display structure comprised of a control circuit containing multiple LEDs to improve appearance and safety display of the wiper; LEDs being connected to a photo-sensor and a vibration switch via the control circuit; the control circuit in a see-through hood and a casing being mounted to the spoiler; LEDs being turned on to display the operation of the wiper during night hours or at where the light is darker as detected by the photo-sensor and the vibration switch.

1 Claim, 5 Drawing Sheets

WINDSHIELD WIPER SPOILER DISPLAY

BACKGROUND OF THE INVENTION (a) Field of the Invention

The present invention is related to a windshield wiper spoiler display structure, and more particularly, to one that is turned on to display the wiper operating in darker area or during night hours.

(b) Description of the Prior Art

To ensure a smooth operation, a spoiler is usually adapted to a windshield wiper or wiper arm. The spoiler helps reduce resistance of the wiper in operation. However, the spoiler of the prior art is not provided with additional features other than its style and wind resistance effect.

Therefore, it is an object of the present invention to provide a windshield wiper spoiler display structure which can obviate and mitigate the above-mentioned drawback.

SUMMARY OF THE INVENTION

The primary purpose of the present invention is to provide a display structure for improved appearance and safety display of a windshield wiper spoiler, which is illuminated during night hours or in darker area when the wiper is activated. To achieve the purpose, the display structure is comprised of a control circuit, whereon multiple LEDs are provided and connected to a photo-sensor and a vibration switch. The control circuit is installed in a see-through hood and a casing. The casing is mounted to a spoiler and the spoiler is mounted on a wiper arm to turn on those LEDs along with the operation of the wiper.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
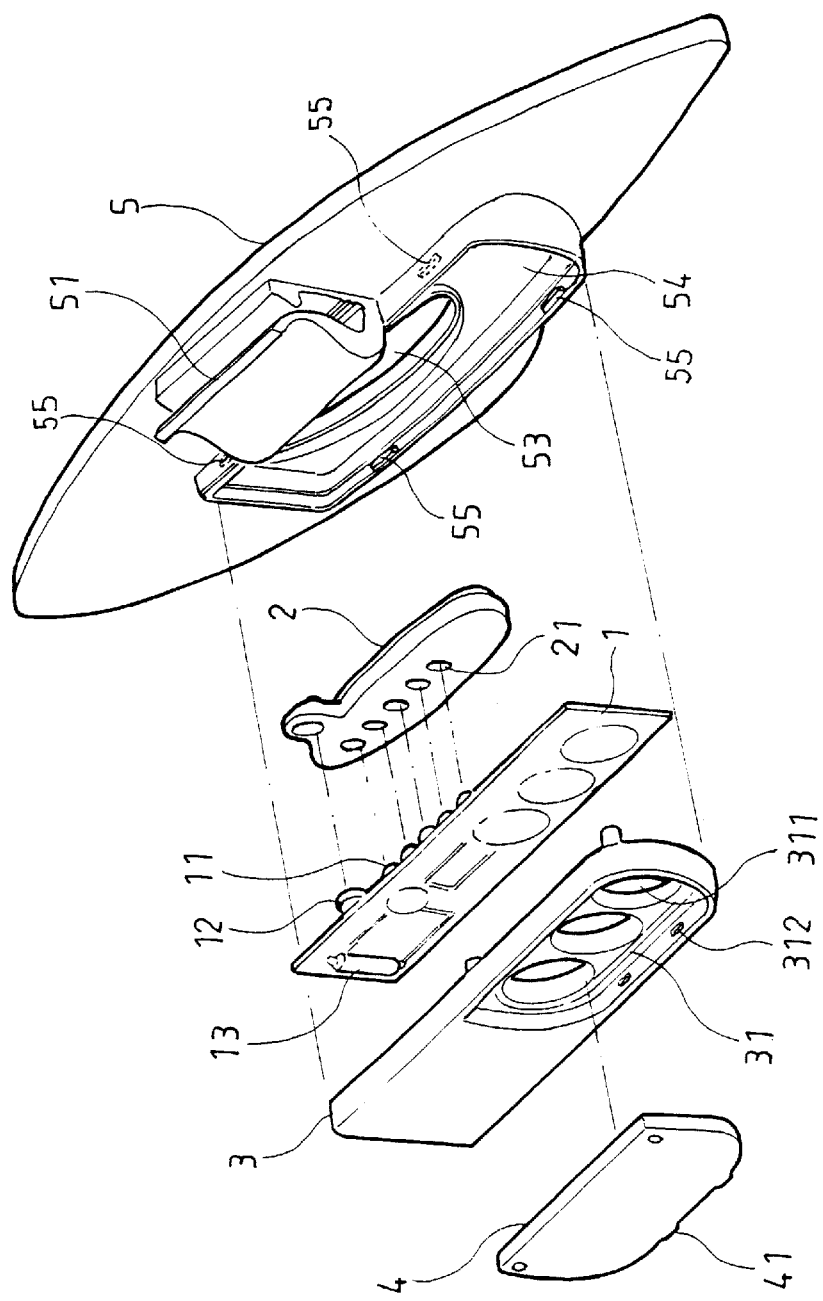
FIGS. 1 and 2 are exploded views of a preferred embodiment of the present invention.
Figure 2:
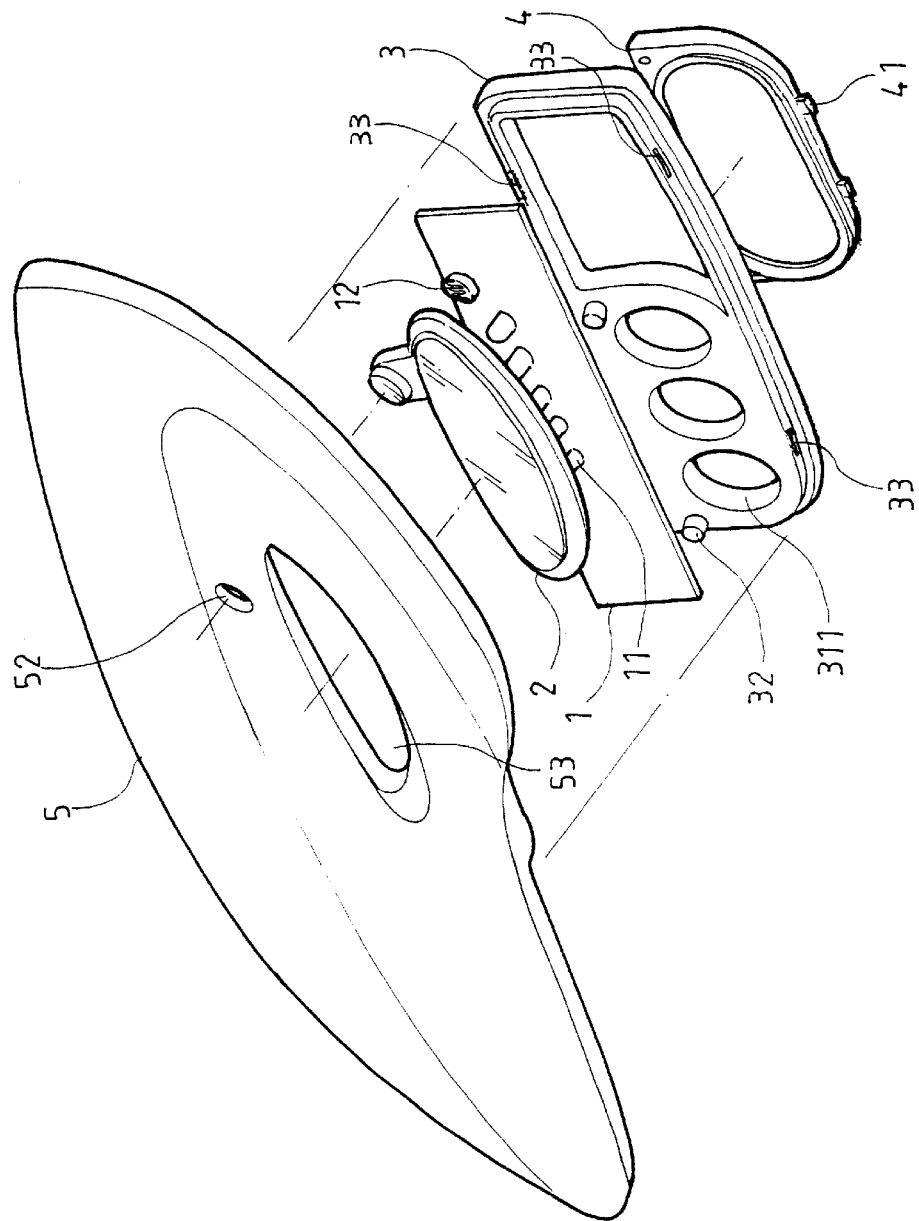
Figure 3:
FIG. 3 is a perspective view of the preferred embodiment of the present invention when assembled.

Referring to FIGS. 1, 2 and 3, a preferred embodiment of the present invention is essentially comprised of a control circuit 1, a see-through hood 2, a casing 3, a lid 4 and a spoiler 5. Wherein, multiple LEDs 11 are provided in a row to the control circuit 1 and connected to a photo-sensor 12 and a vibration switch 13. The control circuit 1 is mounted to the see-through hood 2 whereon multiple insertion holes (21) are provided at where in relation to those LEDs 11 and the photo-sensor 12. The casing 3 is provided with a shallow trough 31, and multiple circular holes 311 are provided in the shallow trough 31 to accommodate multiple cells. A locking hole 312 is also provided in the shallow trough 31 for a hook 41 from the lid 4 to lock up. A pair of symmetrical posts 32 is provided on the back and two locking hooks 33 are provided at the edge of the casing 3. The spoiler 5 is provided at its back a U-shape hook 51 and a pair of through holes 52, 53 on its surface in relation to the see-through hood 2. The circumference of the back of those two through holes 52, 53 is provided with an insertion trough 54, and a pair of locking holes 55 in relation to the locking hooks 33 from the casing 3 are provided at the bottom edge of the insertion trough 54.

When assembled, the control circuit 1 is inserted into the see-through hood 2 and placed flush in the insertion trough 54. The casing 3 is then inserted into the insertion trough 54 of the spoiler 5 and secured by having those locking hooks 33 to engage with those locking holes 55 so to expose the see-through hood 2 out of those two through holes 52, 53 of the spoiler 5. Consequently, the spoiler 5 is inserted to the arm of the wiper with the U-shape locking hook 51. Once the wiper is activated and the vibration switch of the control circuit 1 detects the signals of reciprocal movement of the wiper and the photo-sensor detects the environment light, those LEDs 11 are lighted during night hours or the environment gets darker for achieving safe display and improved appearance results.

Figure 4:
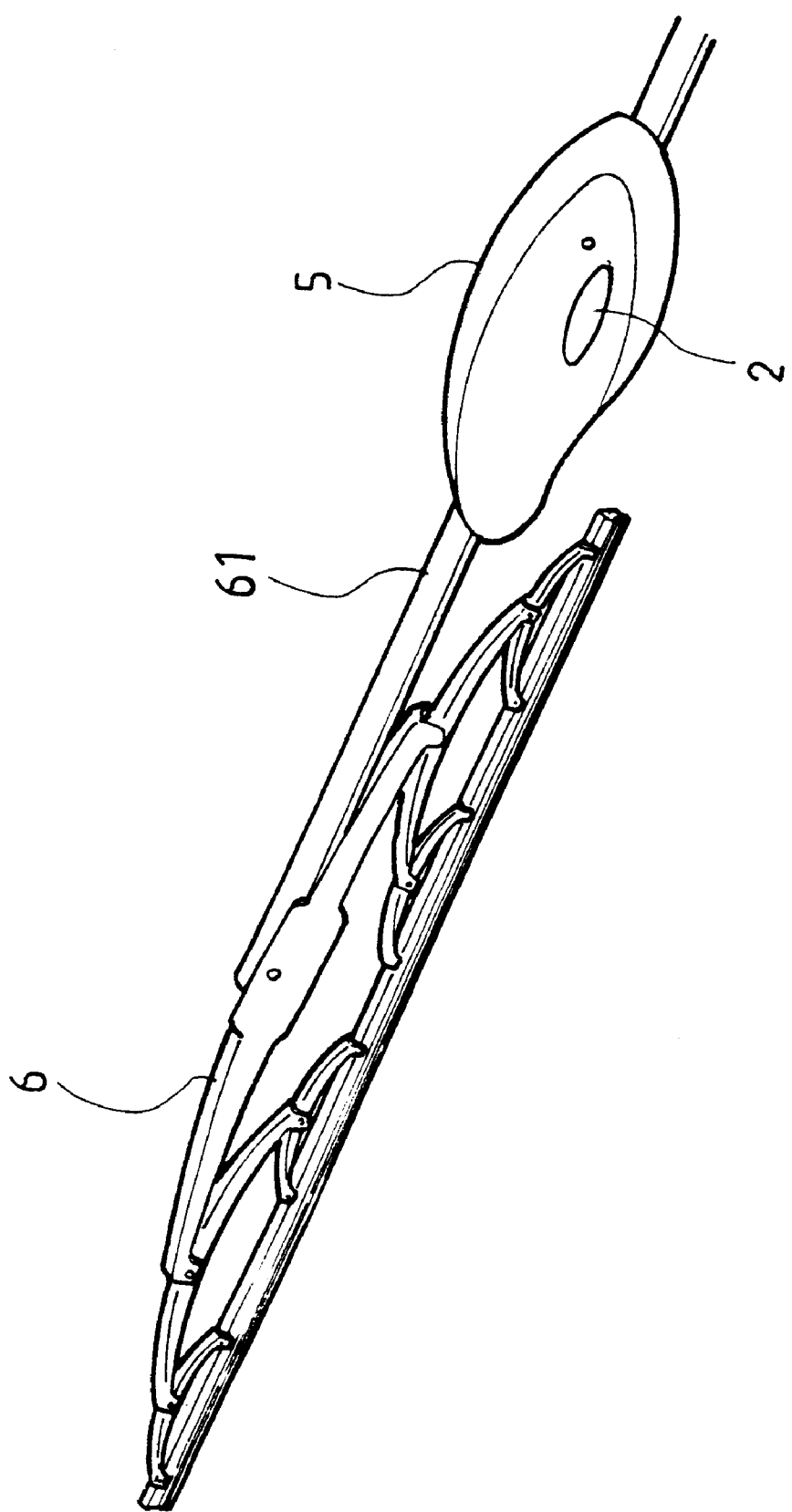
FIG. 4 is a schematic view showing that the preferred embodiment is adapted to a windshield wiper.
Figure 5:
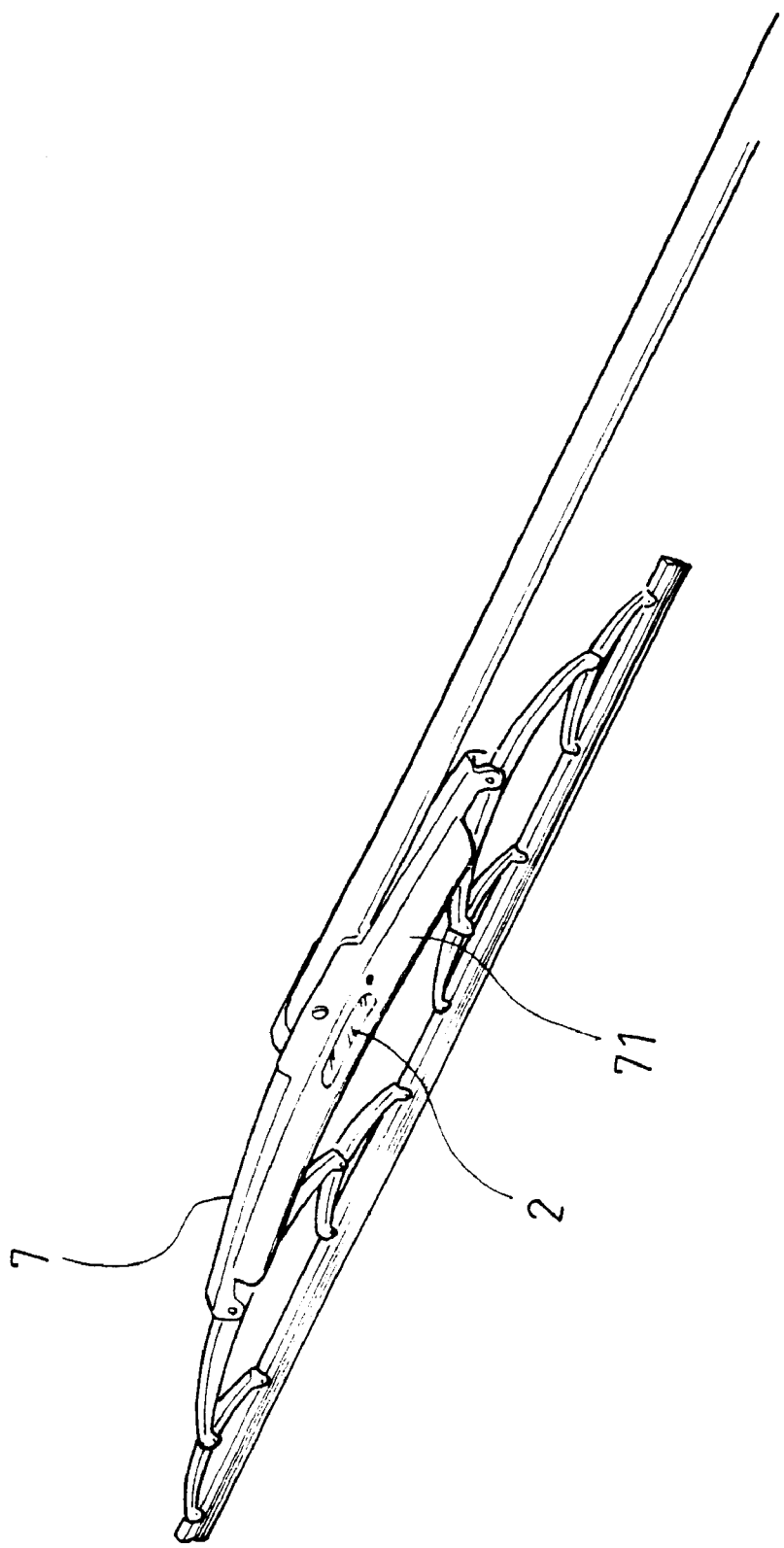
FIG. 5 is a schematic view of another preferred embodiment of the present invention.

Now referring to FIG. 4, the preferred embodiment is directly mounted to a wiper 6 or a spoiler 5 protruding from the wiper 6. Similarly, once the wiper 6 is activated, LEDs are lighted to achieve safe display and improved appearance results.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A windshield wiper spoiler display structure is essentially comprised of a control circuit provided with multiple LEDs in a row; those LEDs being connected to a photo-sensor and a vibration switch; the control circuit being mounted to a spoiler of a wiper; and LEDs being lighted during night hours or in darker environment as detected by the photo-sensor and the vibration switch once the wiper being activated to achieve safe display and improved appearance results, wherein the control circuit is inserted into a see-through hood; the see-through hood being inserted into an insertion trough of the wiper spoiler; the spoiler trough being locked with a casing to expose the see-through hood out of a through hole from the spoiler, a shallow trough is provided to the casing; multiple circular holes in the shallow trough to accommodate cell, a pair of locking holes for corresponding hookers from a lid to lock up, and a pair of posts on the back of the casing to hold against a circuit board, a pair of locking hooks at the bottom edge to lock up the insertion trough of the casing, a hook is provided on the lid to lock into the locking hole of the casing, a U-shaped locking hook is provided on the back of the spoiler for the spoiler to be inserted to a wiper arm, and the control circuit is inserted into the see-through hood and the casing; and the casing is directly mounted to the wiper or the spoiler protruding from the wiper for LEDs display.

* * * * *